(12) United States Patent
Vohlgemuth

(10) Patent No.: US 9,893,589 B2
(45) Date of Patent: Feb. 13, 2018

(54) ELECTRIC MACHINE HAVING A COUPLING FLANGE

(71) Applicant: MOTEURS LEROY-SOMER, Angouleme (FR)

(72) Inventor: Patrick Vohlgemuth, La Rochefoucauld (FR)

(73) Assignee: MOTEURS LEROY-SOMER, Angouleme (FR)

( * ) Notice: Subject to any disclaimer, the term of this patent is extended or adjusted under 35 U.S.C. 154(b) by 137 days.

(21) Appl. No.: 14/772,806

(22) PCT Filed: Mar. 4, 2014

(86) PCT No.: PCT/IB2014/059417
§ 371 (c)(1),
(2) Date: Sep. 4, 2015

(87) PCT Pub. No.: WO2014/136042
PCT Pub. Date: Sep. 12, 2014

(65) Prior Publication Data
US 2016/0020665 A1      Jan. 21, 2016

(30) Foreign Application Priority Data

Mar. 4, 2013   (FR) ...................................... 13 51892

(51) Int. Cl.
*H02K 9/06*          (2006.01)
*H02K 5/22*          (2006.01)
(52) U.S. Cl.
CPC ................ *H02K 5/22* (2013.01); *H02K 9/06* (2013.01)

(58) Field of Classification Search
CPC .................................. H02K 5/22; H02K 9/06
See application file for complete search history.

(56) References Cited

U.S. PATENT DOCUMENTS 3,670,190 A      6/1972   Goebel
4,488,070 A  *  12/1984  Iwaki ....................... H02K 9/06
                                                                310/62
(Continued)

FOREIGN PATENT DOCUMENTS

DE      102009000591      8/2010
FR         2842367         1/2004

OTHER PUBLICATIONS

International Search Report dated May 19, 2014 for PCT/IB2014/059417.

*Primary Examiner* — Dang Le
(74) *Attorney, Agent, or Firm* — Pearne & Gordon LLP

(57) ABSTRACT

The present invention concerns an electric machine (1), in particular an alternator, intended to be coupled to a driving or driven machine, in particular a heat engine, comprising: —a coupling flange (20) for coupling to the driving or driven machine, housing a fan (30) driven by the rotor, said flange comprising: —a rear portion (21) linked to a fixed portion (10) of the electric machine, —an interfacing front portion (22) interfacing with the driving or driven machine, said interfacing front portion being mounted on the rear portion (21), the front portion (22) having a central opening, the fan having a diameter greater than that of the central opening, —at least one air deflector secured to the flange (20).

16 Claims, 2 Drawing Sheets

(56) References Cited

U.S. PATENT DOCUMENTS

Figure 1:
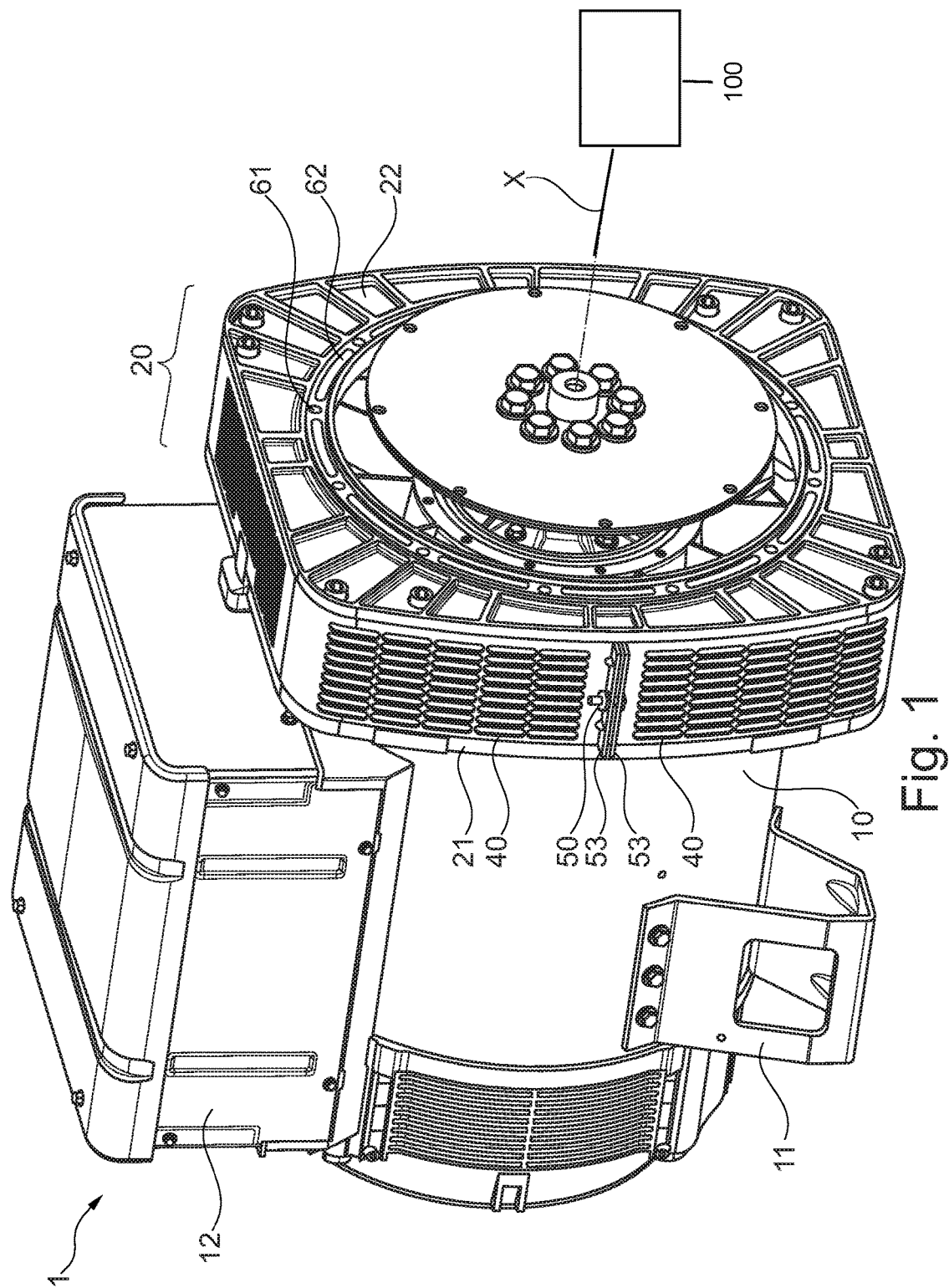

| | | | | |
|---|---|---|---|---|
| 4,643,282 A | * | 2/1987 | Edl | H02K 7/1125 |
| | | | | 192/111.1 |
| 5,936,320 A | * | 8/1999 | Takeda | F02B 63/04 |
| | | | | 310/216.052 |
| 6,661,144 B1 | | 12/2003 | Diener et al. | |
| 8,018,108 B2 | * | 9/2011 | Lafontaine | H02K 1/16 |
| | | | | 310/112 |
| 2004/0051412 A1 | * | 3/2004 | Vohlgemuth | H02K 5/20 |
| | | | | 310/89 |
| 2005/0285459 A1 | | 12/2005 | Ishida et al. | |

* cited by examiner

ELECTRIC MACHINE HAVING A COUPLING FLANGE

The present invention relates to rotating electrical machines, and more specifically, but not exclusively, to industrial alternators.

Traditionally, industrial alternators are machines of which the front part, the driving side, is equipped with a connecting flange which provides the interface with the driving engine. This front part is also the zone in which outlet openings for air for cooling the machine are located. These openings are very often used as a passage for allowing access to the elements fixing the alternator on the engine.

Application FR 2842367 A1 discloses an electric machine comprising, on the front side, a widened part within which rotates a fan and which is created with air outlet grilles which are obtained in one piece by moulding with the rest of the widened part.

Connection to the heat engine is brought about with the aid of a plate attached to the widened part. No deflector is provided inside the widened part to deflect the flow of air generated by the fan before it leaves through the grilles.

US 2005/0285459 discloses an alternator with fans housed in the casing of the machine.

The interface with the driving engine may have different dimensions and different shapes.

There are mainly two types of machines: twin-bearing machines with a shaft end supported by a rolling bearing inside the alternator, and single-bearing machines with coupling discs supported by the flywheel of the driving engine.

The fixed part of the alternator is generally fixed on the engine by means of an interlocking fit, in particular with short centring and with a bearing face that is drilled so as to receive screws.

So as not to excessively multiply the number of diameters of magnetic circuits, these circuits are usually offered in a number of lengths, which leads to a number of alternator powers being associated with the same mechanism, apart from the variation in length of the stator.

The mechanical interfaces of heat engines to be coupled to alternators are governed by standards, in particular standard SAE J 617. Different centring diameters and different diameters of implantation of fixing screws are proposed by this standard. It is therefore very normal for the same type of alternator, depending on its power or depending on the manufacturer of the driving engine for which it is intended, to need to be offered in different standardized diameters meeting the requirements of the standard.

If one-piece coupling flanges are used, this means that the quantities to be produced for each standardized diameter are limited, which makes it impossible to utilize mass-production means, which could be more economical.

In addition, the same mechanism can receive a number of lengths of active part and is therefore suitable for a number of machine powers of which the cooling requirements are different. As a result, the dimensioning of the cooling means/coupling flange pairing is either unique and based on the greatest requirement, or it is adapted to the requirement of each power. In the first case, the cost of the machines having a lesser requirement is disadvantaged, and in the second case, the number of pieces is increased and the quantity of each piece is therefore reduced, with a negative effect on cost, as mentioned above.

Lastly, in applications of industrial generators, a distinction can be made between two broad groups of requirements.

In cases of permanent use, the cost of operation is such that optimization of the overall efficiency of the energy production is desirable. In this case, the efficiency of the alternator takes precedence over power, and the limitation of losses is synonymous with a reduced ventilation requirement.

In cases of occasional use or emergency use, it is the minimization of the initial cost that is desirable, and in order to achieve this the power-to-weight ratio of the alternator is maximized, and therefore the need for ventilation is significant.

On the other hand, in order to satisfy these two types of requirement with the same basic machine, either the same cooling means/coupling flange pairing is maintained, in which case it is overspecified for permanent use, or custom parts are made, but the mass-production effect is lost.

The object of the invention is to overcome the above technical problems completely or in part.

In accordance with one of its aspects, the invention relates to an electric machine, in particular an alternator, to be coupled to a driving or driven machine, in particular a heat engine, comprising:
    a flange for connection to the driving or driven machine, said flange comprising:
        a rear part connected to a fixed part of the electric machine,
        a front part forming an interface with the driving or driven machine, this front interface part being attached to the rear part.

The flange advantageously houses a fan driven by the rotor.

The invention has many advantages.

On the one hand, the rear part may be a piece common to all variations of machines constructed with the same magnetic circuit. Whatever the power, the mechanical engine interface and the need for ventilation, this piece remains the same. Its production cost can therefore be optimized on account of the volume to be produced and it is preferably produced by metal injection, in particular aluminium injection.

The front interface part may be produced in different variants which make it possible to adapt the interface of the machine to the different interfaces standardized in accordance with the above-mentioned SAE standard or even to configure the machine in a twin-bearing version. The variety of pieces is therefore limited to these low-weight pieces. The production method used for these pieces can be different depending on the variants and the quantity to be produced for each variant, and the front part can be produced by cast iron casting, aluminium casting or aluminium injection, or can be made of flame-cut steel, among other techniques.

In addition, since the front part is removable, it is possible to house a fan of large diameter in the flange, said fan being impossible to introduce into a one-piece flange. The front part may thus have a central opening, and the fan may have an outer diameter greater than that of the central opening.

This embodiment therefore advantageously makes it possible to overcome three problems as mentioned above whilst reducing the overall cost of the function.

The flange may comprise one or more assembly mounts extending inside said flange between the front part and the rear part.

The machine preferably comprises one or more deflectors fixed on the flange. The shape and arrangement of the assembly mount(s) advantageously make it possible to receive the air deflector(s). By creating a sort of scroll, this deflector or these deflectors is/are able to limit the pressure losses at the air outlet, thus significantly increasing the air flow rate and therefore the efficacy of the cooling effect provided for the machine. The air deflector(s) can be made of injected plastic, and their cost is therefore very low. At least one air deflector can be fixed on the flange via at least one of said mounts. The deflector can be fixed removably on the flange.

The deflector(s) can be fixed by means of a slide and pinched between the two, front and rear, parts of the flange. The deflector can be arranged so as to be inserted between two adjacent mounts, in particular so as to be mounted slidingly thereon.

The assembly mounts can be formed integrally with the rear part.

The assembly mounts may have tapped holes in order to receive screws for fixing one of the parts to the other.

The flange may comprise at least one air outlet grille, in particular two grilles assembled together. The deflector(s) guide the air towards the outlet grille(s)

The rear part may be attached and fixed to the fixed part of the machine. Preferably, the rear part is fixed to the fixed part by screwing, in particular by screwing in through-bolts.

The deflector(s) guide the air toward the the outlet grille (s).

The rear part may be attached and fixed in various ways to the fixed part of the machine. Preferably, the rear part is fixed to the fixed part by screwing, in particular by screwing in through-bolts.

The invention also relates to a range of electric machines comprising at least two electric machines according to the invention, as defined above, these machines comprising the same rear flange part and different front parts.

The invention also relates to a range comprising two electric machines, these machines comprising the same rear parts and possibly the same front parts also, and, for one of the machines, at least one deflector, preferably arranged on at least one of said assembly mounts, this deflector being absent on the other machine.

Figure 2:
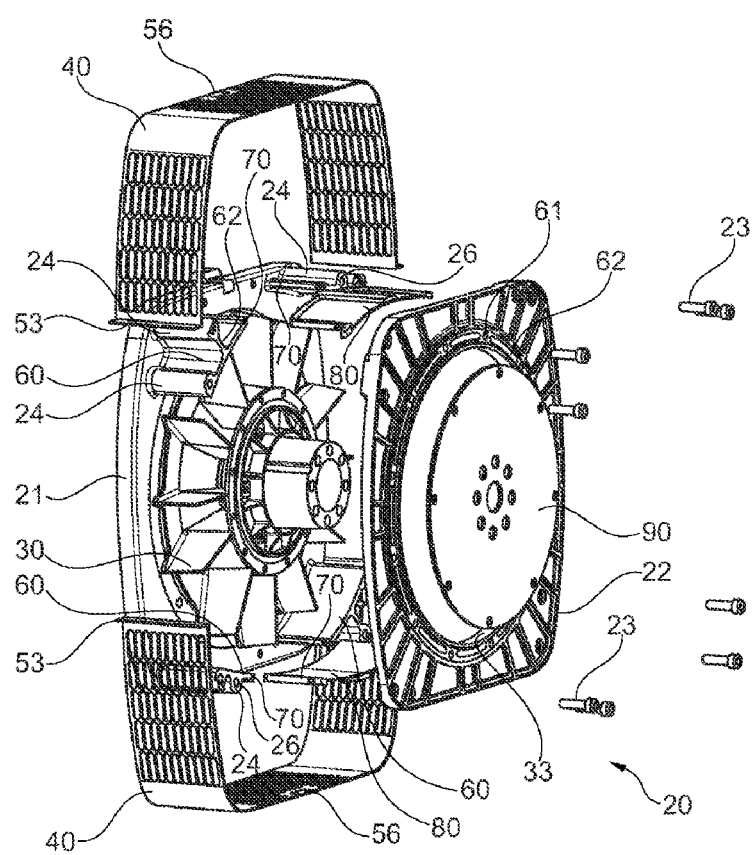

The invention will be better understood upon reading the following detailed description of a non-limiting exemplary embodiment of the invention and upon examining the accompanying drawing, in which:

FIG. 1 shows a schematic perspective view of an example of a machine according to the invention, and FIG. 2 shows an exploded view of the coupling flange of the machine in FIG. 1.

The machine 1 shown in FIGS. 1 and 2 is an alternator to be coupled to a driving machine 100, for example a heat engine, known per se.

The machine 1 comprises a rotor to be driven in rotation about an axis of rotation X, turning inside a stator housed in a casing 10 of the machine, said casing resting for example, as illustrated, via legs 11 on a support (not shown).

The machine 1 may comprise a housing 12, for example housing a terminal block connecting the machine to an installation to be supplied with the electricity produced by the alternator, the housing 12 also possibly comprising, where appropriate, a regulator and/or any other useful electronic circuits.

The casing 10 is preferably made of metal.

The machine 1 is equipped at the front with a coupling flange 20, which connects the machine to the driving machine.

In accordance with the invention, the flange 20, which is shown in greater detail in FIG. 2, comprises a rear part 21, which is connected to the fixed part of the machine, in this case the casing 10, and a front part 22, forming an interface with the driving machine, said front part 22 being connected to the rear part 21.

The rear part 21 can be fixed on the casing 10 by screwing in through-bolts, of which one end is implanted in the tapped holes in the rear part 21. As a variant, the rear part 21 is otherwise fixed to the fixed part 10.

The front part 22 can be fixed on the rear part 21 with the aid of screws 23 screwed into the assembly mounts 24, these mounts having tapped holes 26 provided for this purpose.

In the illustrated example, the assembly mounts 24 are formed in one piece with the rear part 21, for example by aluminium injection. The number of mounts 24 is dependent on the requirements and is preferably at least four, although there are eight in the example considered here, the mounts 24 being arranged in pairs substantially in the four corners of the rear part 21.

A fan 30 is arranged inside the flange 20, between the assembly mounts 24. In the example considered here, the front interface part 22 has a central opening 33 of which the diameter is smaller than the outer diameter of the fan 30, the fan being fixed on the rotor when the front interface part 22 is not yet in place on the rear part 21.

The flange 20 comprises two air outlet grilles 40 which are assembled together by means of fixing elements 50 such as screws, as illustrated in FIG. 1, these fixing elements 50 being engaged for example in drill holes formed on ledges 53 formed at the end of the grilles 40. These grilles each comprise a notch 56.

The notches 56 correspond to clearances which enable access to the cavity of a lifting ring located in the upper part of the rear part of the flange.

The flange 20 comprises scroll portions 60 which, in the illustrated example, are attached to the assembly mounts 24, said scroll portions being formed for example in the form of webs of material produced in one piece with the assembly mounts by means of moulding.

The scroll portions 60 and any webs of material 62 which connect the scroll portions to the assembly mounts 24 help to stiffen the assembly mounts and to increase the mechanical strength of the assembly of the front part 22 on the rear part 21.

As illustrated, the flange 20 preferably comprises reliefs 70 formed so as to enable the fixing of deflectors 80, these deflectors, if fitted, being provided in the flange 20 depending on the ventilation requirements.

When present, these deflectors 80 are inside the flange 20 and complete the scroll portions 60 by defining an air deflection surface which is smooth and arranged so as to guide the air entrained by the fan towards the air outlet grilles 40, thus making it possible to obtain progressive depressurization of the air that exits from the fan. The shape of each of the deflectors 80 is a spiral arc.

The deflectors 80 are preferably made of a thermoplastic material.

The deflectors 80 can be assembled on the reliefs 70 for example by means of sliding, the reliefs 70 thus adopting for example the form of grooves oriented parallel to the axis of rotation X, these grooves being formed at the end of the scroll portions 60. The deflectors 80 are also pinched between the opposed faces of the front and rear parts when these are assembled together.

The front interface part 22 is preferably formed so as to satisfy a standard concerning the coupling of heat engines and alternators, particularly standard SAE J 617.

The front interface part may therefore comprise a set of circular drill holes 61 arranged around its central opening 33. The machine may comprise a coupling disc 90 fixed at its centre on the shaft of the rotor and comprising at its periphery drill holes for fixation to the shaft of the driving machine. Oblong recesses 62 can reduce the mass of this piece and avoid casting shrinkage.

Of course, the invention is not limited to the embodiment that has just been described.

In particular, it is possible to modify the shape of the front interface part 22 so as to adapt it to suit different driving machines.

It is thus possible to have a range of electric machines formed in accordance with the invention, with identical rear flange parts 21 and with front parts 22 that differ according to the driving machines. Likewise, it is possible for this range to comprise electric machines in which the flange comprises deflectors 80, and also other electric machines in which these deflectors 80 are absent, depending on the ventilation requirement.

In the illustrated example, the machine has a casing 10, although there is no departure from the scope of the present invention when this casing is absent.

The front part 22 forming an interface can be produced in a form other than that in which it conforms to standard SAE J 167.

It is possible to fix the deflector(s) 80 inside the flange 20 other than on the reliefs 70 formed with the assembly mounts 24. The deflectors enabling optimization of the air flow rate may thus have different shapes and fixing methods. They can be obtained in different ways and formed from different materials.

The same is true for the front and rear parts of the flange.

The invention claimed is:

1. An alternator, to be coupled to a driving machine, comprising:
   a flange for connection to the driving machine, housing a fan driven by the rotor, said flange comprising:
   a rear part connected to a fixed part of the alternator,
   a front part forming an interface with the driving machine, said front part being attached to the rear part, the front part having a central opening, the fan having a diameter greater than that of the central opening,
   at least one air outlet grille, and
   at least one static air deflector fixed on the flange, between the air outlet grille and the fan inside the flange.

2. The alternator as claimed in claim 1, comprising one or more assembly mounts, the deflector being fixed on the flange by means of the mount(s).

3. The alternator as claimed in claim 2, comprising a plurality of assembly mounts.

4. The alternator as claimed in claim 3, the mounts having tapped holes for receiving screws for fixing one of the parts to the other.

5. The alternator as claimed in claim 4, the mounts being formed in one piece with the rear part.

6. The alternator of claim 3, the assembly mounts extending between the front part and the rear part.

7. The alternator as claimed in claim 2, the deflector being arranged so as to be inserted between two adjacent mounts.

8. The alternator of claim 1, the deflector being arranged so as to be mounted slidingly on the two adjacent mounts.

9. The alternator as claimed in claim 1, the rear part being fixed to the fixed part by screwing in through-bolts of which one end is secured in the tapped holes of the rear part.

10. The alternator as claimed in claim 1, the deflector(s) being made of a thermoplastic material.

11. The alternator as claimed in claim 1, said at least one deflector being removably fixed on the flange.

12. A range of alternators comprising at least two alternators including one alternator as claimed in claim 1, these alternators comprising the same rear part of the flange and different front parts.

13. The range comprising two alternators including one alternator as claimed in claim 1, these alternators comprising the same rear parts and possibly also the same front parts, and, for one of the alternators, at least one deflector.

14. The range of claim 13, the deflector being arranged on at least one of the mounts, this deflector being absent on the other machine.

15. The electric machine of claim 1, the driving machine being a heat engine.

16. An electric machine to be coupled to a driving or driven machine, comprising:
   a flange for connection to the driving or driven machine, housing a fan driven by the rotor, said flange comprising:
   a rear part connected to a fixed part of the electric machine,
   a front part forming an interface with the driving or driven machine, said front part being attached to the rear part, the front part having a central opening, the fan having a diameter greater than that of the central opening,
   at least one air deflector fixed on the flange, inside the flange, and
   two adjacent mounts, the deflector being arranged so as to be inserted between these two adjacent mounts.

* * * * *